US006451721B2

(12) United States Patent
Kawabata et al.

(10) Patent No.: US 6,451,721 B2
(45) Date of Patent: Sep. 17, 2002

(54) DIELECTRIC CERAMIC COMPOSITION

(75) Inventors: Kenji Kawabata, Izumo; Tomomitsu Yamanishi, Shiga-ken; Tomohiro Kawanishi, Shimane-ken; Osamu Yamaoka, Izumo, all of (JP)

(73) Assignee: Murata Manufacturing Co. Ltd. (JP)

( * ) Notice: Subject to any disclaimer, the term of this patent is extended or adjusted under 35 U.S.C. 154(b) by 62 days.

(21) Appl. No.: 09/749,056

(22) Filed: Dec. 27, 2000

(30) Foreign Application Priority Data

Dec. 27, 1999 (JP) ............................................ 11-370601
Dec. 7, 2000 (JP) ........................................ 2000-373452

(51) Int. Cl.$^7$ ........................ C04B 35/47; C04B 35/472
(52) U.S. Cl. .................... 501/135; 501/136; 361/321.4; 361/321.5
(58) Field of Search ................................ 501/135, 136; 361/321.4, 321.5

(56) References Cited

U.S. PATENT DOCUMENTS

| 3,869,398 A | * | 3/1975 | Yamaoka et al. | ............ | 501/136 |
| 4,485,181 A | * | 11/1984 | Sakabe | .................. | 501/136 |
| 4,552,853 A | * | 11/1985 | Kawabata et al. | .......... | 501/134 |
| 4,820,670 A | * | 4/1989 | Sano et al. | .................. | 501/136 |
| 5,073,523 A | * | 12/1991 | Yamada et al. | .............. | 501/136 |

FOREIGN PATENT DOCUMENTS

| JP | 52-61798 | * | 5/1977 |
| JP | 53029599 | * | 3/1978 |
| JP | 1-130405 | * | 5/1989 |
| JP | 4-264307 | * | 9/1992 |

* cited by examiner

*Primary Examiner*—Karl Group
(74) *Attorney, Agent, or Firm*—Dickstein, Shapiro, Morin & Oshinsky, LLP

(57) ABSTRACT

A dielectric ceramic composition contains 100% by weight of main component composed of about 35 to 55% by weight of $SrTiO_3$, about 10 to 35% by weight of $PbTiO_3$, about 5 to 12% by weight of $CaTiO_3$, about 8 to 25% by weight of $Bi_2O_3$ and about 5 to 13% by weight of $TiO_2$, and about 0.02 to 0.5% by weight of MnO, about 0.05 to 2% by weight of an oxide of at least one element selected from the group consisting of La, Ce, Nd, Pr, Sm, Dy, Er and Y, and about 0.02 to 0.8% by weight of CuO. The dielectric ceramic composition can provide a capacitor which exhibits a low loss and a high dielectric constant, and which can be used in the high frequency region, thereby permitting the advance in miniaturization of the capacitor.

12 Claims, 5 Drawing Sheets

DIELECTRIC CERAMIC COMPOSITION

BACKGROUND OF THE INVENTION

1. Field of the Invention

The present invention relates to a dielectric ceramic composition suitable for capacitors used in medium and high voltage applications, for example, such as a snubber circuit of a switching power supply, a TV horizontal resonance circuit, etc, and a capacitor using the dielectric ceramic composition.

2. Description of the Related Art

Like in other electronic devices, frequency is being rapidly increased and size rapidly decreased in a switching power supply or the like. Therefore, a capacitor used in a snubber circuit of the switching power supply is also strongly required to have a smaller size and higher frequency.

In the snubber circuit of the switching power supply, the waveform of a voltage loaded on the capacitor is a non-sinusoidal wave having a frequency of 50 to 150 kHz. It is known that such a non-sinusoidal wave having a constant frequency can be Fourier-expanded to a sinusoidal series containing a high-order frequency component. Namely, a non-sinusoidal wave (f) is represented by the following equation 1:

$$V(t) = V_0 + \Sigma \{Vc_n \cdot \cos(n\omega t) + Vs_n \cdot \sin(n\omega t)\} \quad \text{Equation 1}$$

wherein n represents a natural number of 1 or more, $V_0$ represents a DC bias component, $Vc_n$ represents the amplitude of n-th cosine wave and $Vs_n$ represents the amplitude of n-th sinusoidal wave.

Actual Fourier expansion indicates that the non-sinusoidal wave has a waveform containing a high frequency of up to about 1 MHZ.

The apparent power (Pa) due to a voltage containing the harmonic wave is represented by the following equation 2:

$$Pa = \sum \left\{ \frac{n\omega Cn}{\sqrt{1 + (\tan\delta)^2}} \cdot \frac{Vc_n^2 + Vc_n^2}{2} \right\} \quad \text{Equation 2}$$

where tan δ represents dielectric tangent.

FIG. 1 shows an equivalent circuit of a capacitor. In the equivalent circuit, self heating due to capacitor loss is substantially equal to the energy consumed by equivalent series resistance r, and is thus represented by the following equation 3:

$$Q \approx \frac{\tan\delta}{\sqrt{1 + (\tan\delta)^2}} \cdot Pa \quad \text{Equation 3}$$

Therefore, in order to decrease the self heating of the capacitor in the snubber circuit of the switching power supply or the like, on which the non-sinusoidal wave is loaded, the capacitor loss must be decreased in the frequency range of up to about 1 MHZ.

For the above-described reason, a circuit such as the snubber circuit of the switching circuit, or the like, to which a voltage containing a harmonic wave is applied, causes the problem of the self heating due to capacitor loss. Therefore, a capacitor using a dielectric material causing less loss is used.

For example, Japanese Examined Patent Publication No. 59-8923 discloses a low-loss dielectric material which contains Sr, Pb, Mg and Ti, and which has a dielectric constant of 1500 to 3000 at a measurement frequency of 1 kHz, and a dielectric tangent tan δ of 0.0 to 0.3%.

Also Japanese Examined Patent Publication No. 8-15005 discloses a ceramic composition comprising a main component composed of Sr, Pb, Ca, Bi, Ti and Mn, and a glass component and Cu which are added to the main component.

Japanese Unexamined Patent Publication No. 2-133371 also discloses a ceramic composition comprising a main component composed of Sr, Pb, Ca, Bi, Ti and Mn, and a glass component and Cu which are added to the main component.

A capacitor comprising a conventional low-loss dielectric material has a problem in which use is limited by the self heating of the capacitor when a voltage containing a high harmonic wave is applied, and the problem of limiting miniaturization.

Namely, the dielectric ceramic composition disclosed in Japanese Examined Patent Publication No. 59-8923 has a dielectric tangent tan δ at 1 MHZ of 5% or more, and the problem of limiting the use by the great self heating of the capacitor when a voltage containing a high harmonic wave is applied, as described above.

On the other hand, the dielectric ceramic composition disclosed in Japanese Examined Patent Publication No. 8-15005 has a dielectric constant of as low as about 500 to 1000 at a measurement frequency, and thus has the problem of limiting miniaturization of a capacitor.

In addition, inexpensive copper and nickel have recently been used as electrode materials for a ceramic capacitor instead of conventional versatile silver. Particularly, copper causes no electro-migration as a defect of a silver electrode, and thus exhibits high reliability and is relatively inexpensive. Particularly, in the method of forming a copper electrode by sputtering, a thin film electrode can be formed at low cost.

However, in forming the copper electrode by sputtering, the ceramic sintered body of a ceramic capacitor itself is exposed to an atmosphere under a high vacuum of about $10^{-1}$ Pa during the formation of the electrode. However, the dielectric ceramic compositions disclosed in Japanese Examined Patent Publication No. 59-8923, Japanese Examined Patent Publication No. 8-15005, and Japanese Unexamined Patent Publication No. 2-133371 cause great self heating when used under a signal of a high voltage of several tens to several hundreds V, thereby causing the problem of a large loss.

SUMMARY OF THE INVENTION

Accordingly, it is an object of the present invention to solve the above problems of the conventional techniques and provide a dielectric ceramic composition which can be used in a high frequency region and a high voltage region with a low loss, which can suppress self heating to 20° C. or less, and which can obtain a high dielectric constant, whereby permitting the advance in miniaturization of a capacitor and achieving desired characteristics even when an external electrode is formed by sputtering.

In order to achieve the object, a dielectric ceramic composition of the present invention comprises 100% by weight of a main component composed of about 35 to 55% by weight of $SrTiO_3$, about 10 to 35% by weight of $PbTiO_3$, about 5 to 12% by weight of $CaTiO_3$, about 8 to 25% by weight of $Bi_2O_3$, and about 5 to 13% by weight of $TiO_2$, and about 0.02 to 0.5% by weight of MnO, about 0.05 to 2% by weight of an oxide of at least one element selected from the group consisting of La, Ce, Nd, Pr, Sm, Dy, Er and Y, and about 0.02 to 0.8% by weight of CuO.

A capacitor of the present invention comprises a ceramic sintered body composed of the dielectric ceramic composition of the present invention, and a plurality of thin film electrodes formed on the outer surface of the ceramic sintered body and mainly composed of copper.

In a particular aspect of the present invention, a lead terminal in the capacitor is connected to each of the plurality of thin film electrodes.

DESCRIPTION OF THE PREFERRED EMBODIMENTS

Figure 1:
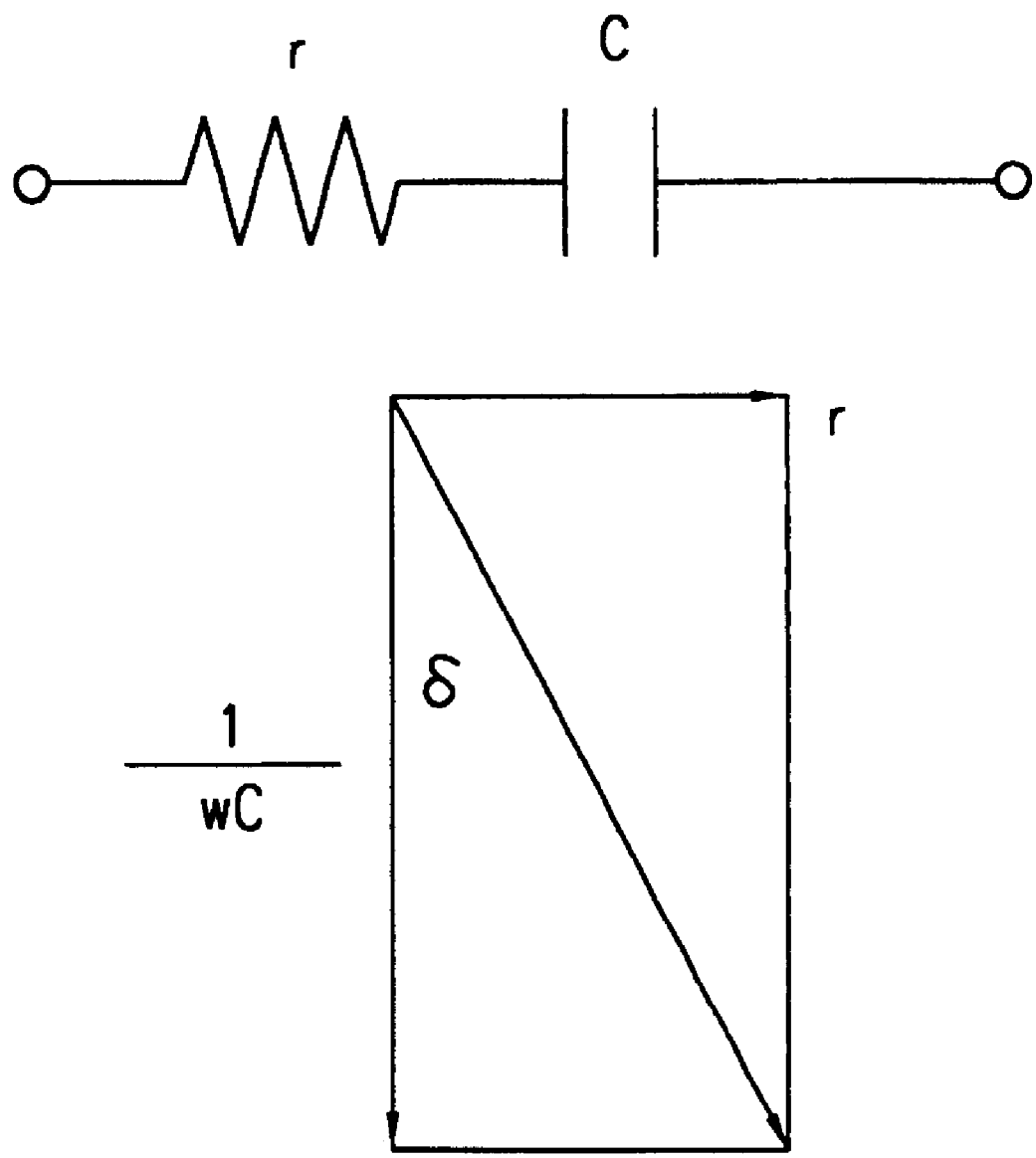
FIG. 1 is a drawing illustrating an equivalent circuit of a capacitor.

The dielectric ceramic composition of the present invention will be described in detail below.

In the dielectric ceramic composition of the present invention, 100% by weight of the main component comprises about 35 to 55% by weight of $SrTiO_3$, about 10 to 35% by weight of $PbTiO_3$, about 5 to 12% by weight of $CaTiO$, about 8 to 25% by weight of $Bi_2O_3$, and about 5 to 13% by weight of $TiO_2$, With less than about 35% by weight of $SrTiO_3$, tan δ at 1 MHZ exceeds 1.5%, while with over about 55% by weight of $SrTiO_3$, the dielectric constant is less than 1500. $SrTiO_3$ is preferably contained in the main component in the range of about 40 to 50% by weight.

With a $PbTiO_3$ mixing ratio of less than about 10% by weight, the dielectric constant is less than 1500, while with over about 35% by weight of $PbTiO_3$, tan δ at 1 MHZ exceeds 1.5%. $PbTiO_3$ is preferably contained in the main component in the range of about 15 to 25% by weight.

With less than about 5% by weight a $CaTiO_3$, tan δ at 1 MHZ exceeds 1.5%, while with over about 12% by weight of $CaTiO_3$, the self heating of a capacitor is 20° C. or more when used under a signal at a high voltage of several tens to several hundreds V, thereby possibly causing deterioration in the capacitor.

With less than about 8% by weight of $Bi_2O_3$, the dielectric constant is less than 1500, while with over about 25% by weight of $Bi_2O_3$, tan δ at 1 MHZ exceeds 1.5%. $Bi_2O_3$ is preferably contained in the main component in the range of about 13 to 19% by weight.

With less than about 5% by weight of $TiO_2$, the dielectric constant is less than 1500, while with over about 13% by weight of $TiO_2$, tan δ at 1 MHZ exceeds 1.5%. $TiO_2$ is preferably contained in the main component in the range of about 6 to 10% by weight.

Furthermore, MnO is contained at a ratio of about 0.02 to 0.5% by weight based on 100% by weight of the main component. With less than about 0.02% by weight of MnO, tan δ at 1 MHZ exceeds 1.5%, while with over about 0.5% by weight of MnO, sinterability deteriorates, and insulation resistance is decreased. MnO is preferably contained in the main component in the range of about 0.1 to 0.5% by weight.

Also an oxide of at least one element selected from La, Ce, Nd, Pr, Sm, Dy, Er and Y is contained at a ratio of about 0.05 to 2% by weight based on 100% by weight of the main component. With less than about 0.05% by weight of the oxide, reduction resistance deteriorates and humidity load reliability also deteriorates, while with over about 2% by weight of the oxide, the dielectric constant is less than 1500. The oxide is preferably contained in the main component at a ratio of about 0.1 to 1.2% by weight.

CuO is also contained at a ratio of about 0.02 to 0.8% by weight based on 100% by weight of the main component. With less than about 0.02% by weight of CuO, tan δ at 1 MHZ exceeds 1.5%, while with over about 0.8% by weight of CuO, sinterability deteriorates, and insulation resistance is decreased. CuO is preferably contained at a ratio of about 0.1 to 0.5% by weight.

Figure 2B:
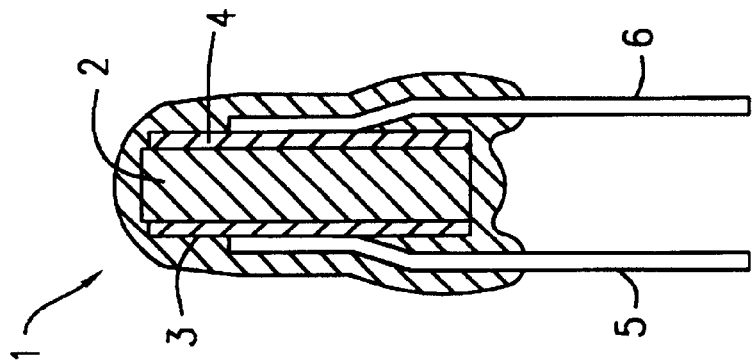
FIGS. 2A and 2B are a partially cut-away front view and side sectional view showing an example of a capacitor according to an embodiment of the present invention.
Figure 2A:
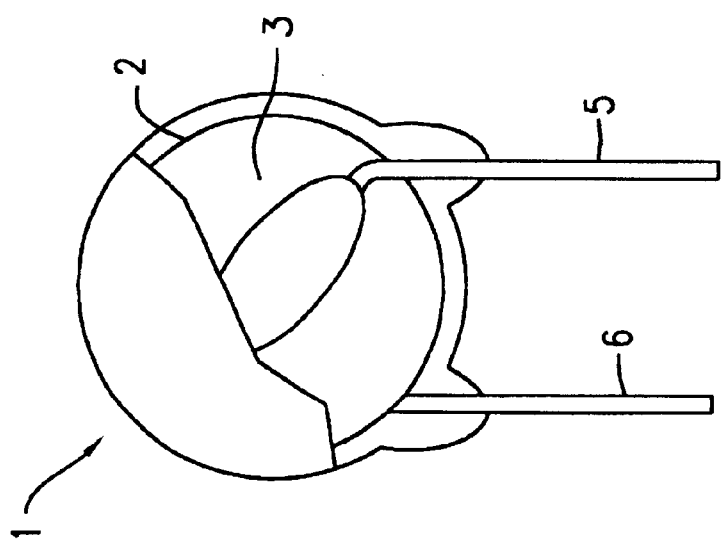

A capacitor of the present invention has a structure in which a plurality of thin film electrodes mainly composed of copper are formed on the outer surfaces of a ceramic sintered body composed of the dielectric ceramic composition of the present invention. In this case, the shape of the ceramic sintered body is not limited. For example, a disk-formed ceramic sintered body 2 is preferably used, as in the ceramic capacitor 1 of an embodiment shown in FIGS. 2A and 2B. In the ceramic capacitor 1 of the embodiment shown in FIGS. 2A and 2B, thin film electrodes 3 and 4 mainly composed of copper are formed as external electrodes to cover the opposed first and second main surfaces 1a and 2b of the ceramic sintered body 2. The thin film electrodes 3 and 4 are formed by sputtering copper. Besides sputtering, the thin film electrodes 3 and 4 may be formed by another thin film deposition method such as vapor deposition or the like.

The thin film electrodes are preferably formed by the sputtering so that the thin external electrodes can be formed at low cost.

In the capacitor 1, lead terminals 5 and 6 are connected to the thin film electrodes 3 and 4, respectively. The capacitor of the present invention may be constructed as a chip type capacitor to which no lead terminal is connected, or may be a monolithic capacitor comprising internal electrodes.

The operation and effect of the present invention will be described in detail below with reference to experimental examples.

First, $SrCO_3$, $Pb_3O_4$, $CaCO_3$, $Bi_2O_3$, $TiO_2$, $MnCO_3$ and CuO, and at least one of CuO, $La_2O_3$, $CeO_2$, $Nd_2O_3$, $Pr_2O_3$, $Sm_2O_3$, $Dy_2O_3$, $Er_2O_3$ and $Y_2O_3$ having a purity of 99% by weight or more were weighed as raw materials so that the compositions shown in Table 1 below were obtained, and each of the compositions was poured into a polyethylene pot together with pure water. These materials were mixed in the polyethylene pot, and each of the mixtures was ground by wet mixing using balls composed of $ZeO_2$ for 16 hours. The thus-obtained ground product was dried by dehydration, and placed in a zirconia container in which the product was calcined at 950 to 1000° C. for 2 hours.

The thus-obtained calcined product was placed in the polyethylene pot together with a binder, followed by wet mixing for 16 hours. The resultant mixture was dried by evaporation, and then molded under pressure after size regulation to form a disk having a diameter of 10 mm and a thickness of 0.8 mm.

The thus-obtained disk molded product was burned at a temperature of 1150 to 1200° C. for 2 hours to obtain a disk-shaped ceramic sintered product.

Then, thin film electrodes mainly composed of copper were formed on both main surfaces of the ceramic sintered body by sputtering to obtain a capacitor.

The thus-obtained capacitor was measured for (1) dielectric constant, (2) dielectric tangent (1 kHz), (3) dielectric tangent (1 MHZ), and (4) temperature characteristics under the following conditions.

(1) Dielectric constant . . . measured at a temperature of 20° C. with a current of 1 kHz and 1 V supplied.

(2) Dielectric tangent (1 kHz) . . . measured at a temperature of 20° C. with a current of 1 kHz and 1 V supplied.

(3) Dielectric tangent (1 MHZ) . . . measured at a temperature of 20° C. with a current of 1 MHZ and 1 V supplied.

(4) Temperature characteristics . . . The dielectric constant (measured at a temperature of 20° C. with a current of 1 kHz and 1 V supplied) was measured in the temperature range of −25° C. to +85° C. to determine the rate of change (conversion of dielectric constant/° C.) relative to the dielectric constant at +20° C.

Also, the frequency characteristics of the dielectric tangent in the frequency region of 100 to 1000 kHz were measured at a measurement voltage of 1 V and a temperature of 20° C. with respect to the capacitor (Sample No. 2) having a typical composition of the present invention, and a conventional capacitor (Sample No. 37) among the capacitors obtained as described above.

Furthermore, the capacitor (Sample No. 25) having a typical composition of the present invention, and a conventional capacitor (Sample No. 37) were selected from the capacitors obtained as described above, and each of the sinusoidal waves under the conditions 1 to 4 below was applied to each of the capacitors to measure the self heating. The conditions 1 to 4 correspond to an apparent power of 130 V·A.

Condition 1 . . . 92 kHz, $1100V_{p-p}$
Condition 2 . . . 184 kHz, $780V_{p-p}$
Condition 3 . . . 276 kHz, $635V_{p-p}$
Condition 4 . . . 460 kHz, $492V_{p-p}$ The same capacitor having the typical composition as described above was tested for humidity load reliability. In this reliability test, 20 capacitors were evaluated by applying a voltage of DC 2 kV under the conditions of 60° C. and relative humidity of 90 to 95% to measure the number of the capacitors causing a failure until 4000 hours elapsed. The failure represents the occurrence of a short circuit in a sample.

Figure 3:
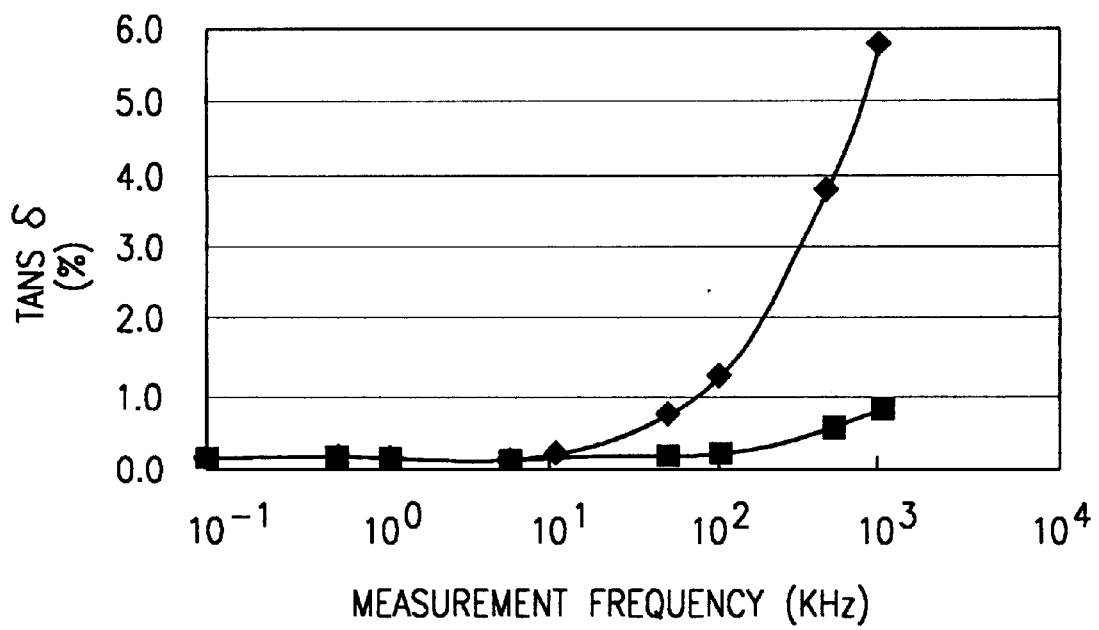
FIG. 3 is a drawing showing the frequency characteristics of dielectric tangent of a capacitor of an embodiment of the present invention and a capacitor of a conventional example.
Figure 4:
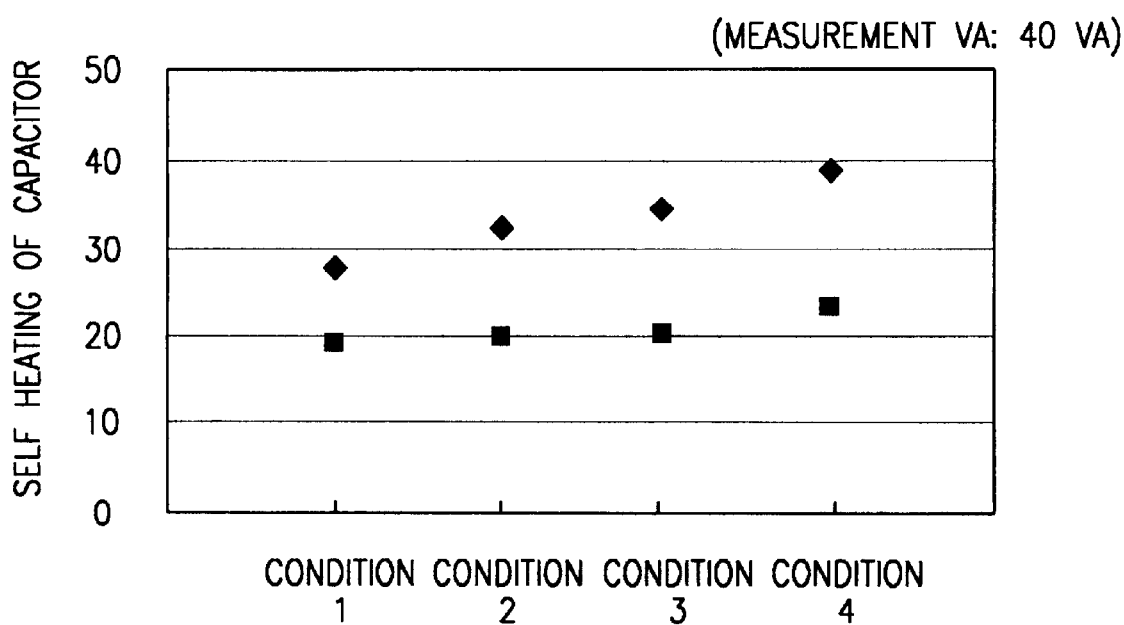
FIG. 4 is a drawing showing the self heating of capacitors of examples of the present invention and capacitors of conventional examples under conditions 1 to 4.

The results of the above evaluations are shown in Tables 1 to 4 and FIGS. 3 and 4. In these figures, the diamonds represent the conventional capacitor and the squares represent the inventive capacitor.

TABLE 1

| Sample No. | Composition (% by weight) | | | | | | | | | Electric characteristics | | | |
|---|---|---|---|---|---|---|---|---|---|---|---|---|---|
| | $SrTiO_3$ | $PbTiO_3$ | $CaTiO_3$ | $Bi_2O_3$ | $TiO_2$ | MnO | CuO | Type of oxide | Amount of oxide added | Dielectric constant at 1kHz | Dielectric tangent (%) at 1kHz | Dielectric tangent (%) at 1 MHz | Tem. characteristic of dielectric constant −25° C. (%) | Tem. characteristic of dielectric constant +85° C. (%) |
| 1 | 49.61 | 21.70 | 7.57 | 13.95 | 7.17 | 0.15 | 0.15 | $CeO_2$ | 0.20 | 1530 | 0.1 | 0.6 | +11 | −16 |
| 2 | 46.17 | 21.12 | 8.95 | 15.69 | 8.07 | 0.15 | 0.15 | $CeO_2$ | 0.20 | 1850 | 0.1 | 0.8 | +10 | −16 |
| 3 | 45.57 | 17.38 | 10.39 | 17.61 | 9.05 | 0.15 | 0.15 | $CeO_2$ | 0.19 | 2290 | 0.1 | 1.0 | +12 | −19 |
| 4 | 48.69 | 18.54 | 11.09 | 14.31 | 7.37 | 0.15 | 0.15 | $CeO_2$ | 0.20 | 2750 | 0.2 | 1.5 | +14 | −27 |
| 5 | 48.68 | 18.55 | 11.10 | 14.31 | 7.36 | 0.15 | 0.41 | $CeO_2$ | 0.20 | 2100 | 0.3 | 0.6 | +8 | −17 |
| 6 | 48.67 | 18.55 | 11.10 | 14.31 | 7.37 | 0.15 | 0.80 | $CeO_2$ | 0.20 | 1650 | 0.3 | 0.5 | +7 | −15 |
| 7 | 45.75 | 21.94 | 10.94 | 14.11 | 7.26 | 0.15 | 0.25 | $CeO_2$ | 0.25 | 2020 | 0.2 | 0.8 | +10 | −16 |
| 8 | 45.76 | 21.95 | 10.94 | 14.11 | 7.24 | 0.15 | 0.25 | $CeO_2$ | 1.00 | 1790 | 0.1 | 0.6 | +12 | −17 |
| 9 | 45.76 | 21.94 | 10.94 | 14.11 | 7.25 | 0.15 | 0.25 | $Y_2O_2$ | 0.18 | 2060 | 0.2 | 1.0 | +9 | −16 |
| 10 | 45.76 | 21.94 | 10.94 | 14.11 | 7.25 | 0.15 | 0.25 | $Y_2O_2$ | 0.71 | 1880 | 0.2 | 1.1 | +10 | −16 |
| 11 | 45.76 | 21.94 | 10.94 | 14.11 | 7.25 | 0.15 | 0.25 | $Er_2O_2$ | 0.29 | 2090 | 0.2 | 1.0 | +9 | −16 |
| 12 | 45.76 | 21.94 | 10.94 | 14.11 | 7.25 | 0.15 | 0.25 | $Er_2O_2$ | 1.17 | 1900 | 0.2 | 1.0 | +10 | −16 |
| 13 | 43.90 | 25.12 | 9.98 | 13.87 | 7.14 | 0.02 | 0.15 | $Er_2O_2$ | 0.34 | 1730 | 0.1 | 1.2 | +11 | −16 |
| 14 | 44.01 | 24.97 | 9.97 | 13.90 | 7.15 | 0.50 | 0.15 | $Er_2O_2$ | 0.70 | 1590 | 0.3 | 0.6 | +8 | −14 |
| 15 | 35.35 | 33.42 | 11.58 | 12.98 | 6.67 | 1.10 | 0.40 | $CeO_2$ | 0.20 | 2700 | 0.4 | 1.4 | +13 | −23 |
| 16 | 50.63 | 18.44 | 9.38 | 14.23 | 7.32 | 0.15 | 0.15 | $CeO_2$ | 0.20 | 2140 | 0.2 | 0.6 | +14 | −21 |
| 17* | 46.92 | 12.96 | 17.43 | 14.98 | 7.71 | 0.10 | 0.05 | $CeO_2$ | 0.20 | 1560 | 0.2 | 0.6 | +12 | −20 |
| 18 | 45.58 | 17.38 | 10.40 | 17.60 | 9.04 | 0.15 | 0.15 | $CeO_2$ | 1.91 | 1540 | 0.1 | 0.7 | +11 | −18 |

TABLE 2

| Sample No. | Composition (% by weight) | | | | | | | | | Electric characteristics | | | | |
|---|---|---|---|---|---|---|---|---|---|---|---|---|---|---|
| | SrTiO$_3$ | PbTiO$_3$ | CaTiO$_3$ | Bi$_2$O$_3$ | TiO$_2$ | MnO | CuO | Type of oxide | Amount of oxide added | Dielectric constant at 1kHz | Dielectric tangent (%) at 1kHz | Dielectric tangent (%) at 1 MHz | Tem. characteristic of dielectric constant −25° C. (%) | Tem. characteristic of dielectric constant +85° C. (%) |
| 19 | 46.17 | 21.12 | 8.95 | 15.69 | 8.07 | 0.15 | 0.15 | La$_2$O$_3$ | 0.20 | 1810 | 0.2 | 0.9 | +10 | −16 |
| 20 | 46.17 | 21.12 | 8.95 | 15.69 | 8.07 | 0.15 | 0.15 | Nd$_2$O$_3$ | 0.20 | 1830 | 0.2 | 0.9 | +11 | −17 |
| 21 | 46.17 | 21.12 | 8.95 | 15.69 | 8.07 | 0.15 | 0.15 | Pr$_2$O$_3$ | 0.20 | 1850 | 0.2 | 0.9 | +11 | −17 |
| 22 | 46.17 | 21.12 | 8.95 | 15.69 | 8.07 | 0.15 | 0.15 | Sm$_2$O$_3$ | 0.20 | 1850 | 0.3 | 1.0 | +12 | −18 |
| 23 | 46.17 | 21.12 | 8.95 | 15.69 | 8.07 | 0.15 | 0.15 | Dy$_2$O$_3$ | 0.20 | 1870 | 0.3 | 1.2 | +13 | −19 |
| 24* | 53.02 | 20.84 | 12.17 | 8.68 | 5.29 | 0.16 | 0.22 | CeO$_2$ | 0.22 | 1530 | 0.2 | 0.8 | +13 | −23 |
| 25 | 42.34 | 21.31 | 11.86 | 15.74 | 8.10 | 0.25 | 0.25 | CeO$_2$ | 0.15 | 1550 | 0.1 | 0.9 | +10 | −16 |
| 26 | 41.40 | 15.77 | 9.44 | 22.05 | 11.34 | 0.14 | 0.23 | CeO$_2$ | 0.23 | 1580 | 0.5 | 1.5 | +10 | −15 |
| 27* | 29.78 | 38.99 | 11.58 | 12.98 | 6.67 | 1.10 | 0.40 | CeO$_2$ | 0.20 | 3000 | 0.8 | 2.2 | +10 | −30 |
| 28* | 37.24 | 14.19 | 8.49 | 26.47 | 13.61 | 0.15 | 0.25 | CeO$_2$ | 0.25 | 1430 | 0.9 | 3.0 | +9 | −14 |
| 29* | 45.73 | 17.32 | 10.36 | 17.56 | 9.03 | 0 | 0 | CeO$_2$ | 0.20 | 2530 | 0.8 | 2.5 | +15 | −26 |
| 30* | 55.90 | 20.85 | 12.19 | 7.04 | 4.02 | 0.16 | 0.22 | CeO$_2$ | 0.22 | 1330 | 0.2 | 0.7 | +14 | −26 |
| 31* | 36.37 | 13.86 | 23.11 | 17.61 | 9.05 | 0.15 | 0.15 | CeO$_2$ | 0.19 | 1420 | 0.1 | 1.0 | +12 | −17 |
| 32* | 52.36 | 9.04 | 11.94 | 17.61 | 9.05 | 0.15 | 0.15 | CeO$_2$ | 0.19 | 1000 | 0.1 | 0.9 | +11 | −20 |
| 33* | 46.17 | 21.12 | 8.95 | 15.69 | 8.07 | 0.25 | 0.25 | — | — | 1940 | 0.3 | 1.5 | +10 | −17 |
| 34* | 46.17 | 21.12 | 8.95 | 15.69 | 8.07 | 0.15 | 0.30 | CeO$_2$ | 2.30 | 1050 | 0.3 | 1.0 | +18 | −20 |
| 35* | 48.67 | 18.55 | 11.10 | 14.31 | 7.37 | 0.15 | 1.0 | CeO$_2$ | 0.20 | 1320 | 0.4 | 0.5 | +6 | −13 |
| 36* | 48.69 | 25.83 | 3.80 | 14.31 | 7.37 | 0.15 | 0.05 | CeO$_2$ | 0.20 | 3250 | 0.5 | 2.3 | +16 | −33 |
| 37* | 44.01 | 24.97 | 9.97 | 13.90 | 7.15 | 0.80 | 0.15 | Er$_2$O$_3$ | 0.70 | 1230 | 0.5 | 0.8 | +9 | −13 |

TABLE 3

| Sample No. | Composition (% by weight) | | | | | Dielectric constant at 1 kHz | Dielectric tangent (%) at 1 kHz | Dielectric tangent (%) at 1 MHz | Tem. characteristic of dielectric constant −25° C. (%) | Tem. characteristic of dielectric constant +85° C. (%) |
|---|---|---|---|---|---|---|---|---|---|---|
| | SrTiO$_3$ | MgTiO$_3$ | Bi$_2$O$_3$ | TiO$_2$ | Pb$_2$O$_3$ | | | | | |
| 38* | 54.0 | 5.0 | 26.9 | 9.1 | 5.0 | 1510 | 0.0 | 5.2 | +7 | −11 |

*Sample out of the range of the present invention.

TABLE 4

| Dielectric composition | Type of electrode | Number of failures in humidity load test |
|---|---|---|
| This invention Sample No. 7 in Table 1 | Thin film electrode mainly composed of copper (sputtering) | 0/20 |
| This invention Sample No. 8 in Table 1 | Thin film electrode mainly composed of copper (sputtering) | 0/20 |
| This invention Sample No. 9 in Table 1 | Thin film electrode mainly composed of copper (sputtering) | 0/20 |
| This invention Sample No. 10 in Table 1 | Thin film electrode mainly composed of copper (sputtering) | 0/20 |
| This invention Sample No. 11 in Table 1 | Thin film electrode mainly composed of copper (sputtering) | 0/20 |
| This invention Sample No. 12 in Table 1 | Thin film electrode mainly composed of copper (sputtering) | 0/20 |
| This invention Sample No. 19 in Table 1 | Thin film electrode mainly composed of copper (sputtering) | 0/20 |
| This invention Sample No. 20 in Table 1 | Thin film electrode mainly composed of copper (sputtering) | 0/20 |
| This invention Sample No. 21 in Table 1 | Thin film electrode mainly composed of copper (sputtering) | 0/20 |
| This invention Sample No. 22 in Table 1 | Thin film electrode mainly composed of copper (sputtering) | 0/20 |
| This invention Sample No. 23 in Table 1 | Thin film electrode mainly composed of copper (sputtering) | 0/20 |
| Sample No 32 in Table 1 having composition out of the range of this invention | Thin film electrode mainly composed of copper (sputtering) | 2/20 |
| Conventional example Japanese Examined Patent Publication No. 59-8923 | Silver thick electrode | 4/20 |

(The number of failures represents the number of samples causing a failure among 20 test samples.)

Tables 1 and 2 indicate that the capacitors of Sample Nos. 1 to 26 within the range of the present invention have a dielectric constant εr of as high as 1500 or more, and can thus be miniaturized. It is also found that the dielectric tangent tan δ at 1 MHZ is 1.5% or less, and thus a dielectric ceramic composition exhibiting excellent properties in the high frequency region can be provided.

Therefore, the present invention can decrease the size of a capacitor, and decrease the self heating due to capacitor loss when a non-sinusoidal wave containing the above-described high harmonic wave is applied because of the small dielectric tangent at a high frequency.

It is further found that an oxide of at least one element of La, Ce, Nd, Sm, Dy, Er and Y is added to improve the reduction resistance of a dielectric ceramic composition.

The improvement in reduction resistance of the ceramic composition permits the formation of thin film electrodes mainly composed of copper on the surface by a thin film deposition method such as sputtering or the like, as described above, thereby providing a ceramic capacitor having excellent reliability, as shown in Table 4.

FIG. 4 shows the results of measurement of the self heating of the capacitors. FIG. 4 indicates that the capacitor of Sample No. 2 of the present invention exhibits self heating in the range of ½ to ⅔ of the self heating of the capacitor of Sample No. 37 corresponding to a conventional capacitor, thereby suppressing the self heating to 20° C. or less. Furthermore, the dielectric tangent tan δ at a high frequency (up to 1 MHZ) is small, and thus less heating occurs in the high frequency region and the high voltage region. Therefore, a capacitor suitable for, for example, a high frequency of a snubber circuit of a switching power supply can be provided.

Furthermore, the capacitors of Samples Nos. 2 and 25 having the typical compositions of the present invention, and the capacitors of Sample Nos. 17 and 24 out of the range of the present invention were selected, and a high-frequency high-electric-field signal of 92 kHz and 1100 $V_{p-p}$ was loaded on each of the capacitors to measure self heating. The results of the measurement and the results of a high-temperature load reliability test are shown in Table 5. In the high-temperature load reliability test, 20 capacitor samples were evaluated by continuously applying a load of 92 kHz and 1100 $V_{p-p}$ under the condition of an ambient temperature of 125° C. to measure the number of the capacitors causing a failure by the time that 4000 hours elapsed. The failure represents the occurrence of a short circuit in a capacitor.

Figure 5:
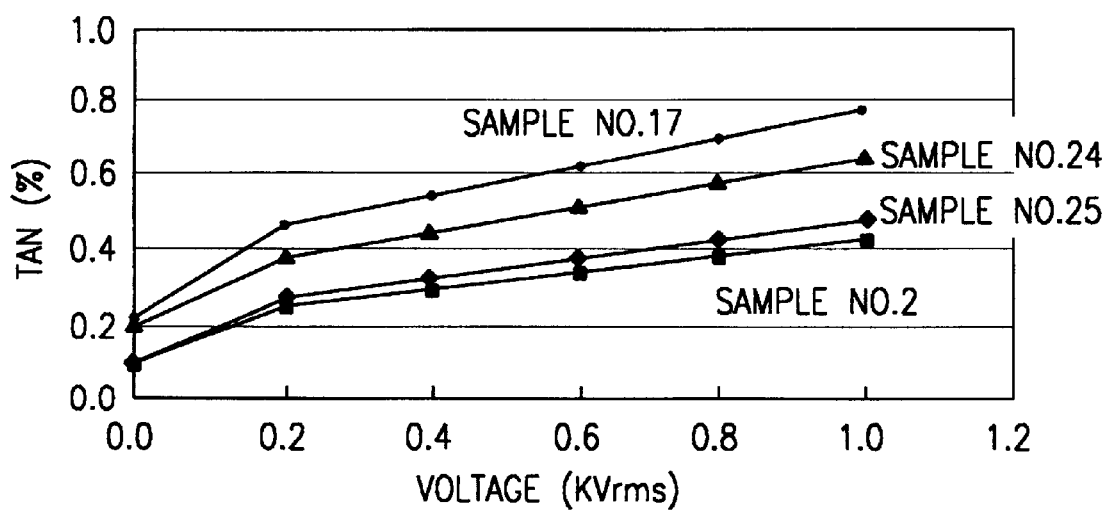
FIG. 5 is a drawing showing the dependency on the AC voltage with respect to a capacitor of an example of the present invention and a capacitor out of the range of the present invention.

Also, the voltage was changed from 1 V to 1000 Vrms with an AC signal of 60 Hz to measure the dielectric tangent tan δ of each of the capacitors. The results are shown in FIG. 5.

TABLE 5

| Sample No. | Self heating of capacitor (° C.) | Number of failures in high-temperature load test |
|---|---|---|
| 2 | 17 | 0/20 |
| 17 | 28 | 3/20 |
| 24 | 23 | 1/20 |
| 25 | 19 | 0.20 |

Table 5 indicates that in Sample Nos. 2 and 25 in the range of the present invention, the self heating can be suppressed to 20° C. or less. Also, in Sample Nos. 2 and 25 exhibiting the self heating of 20° C. or less, no failure occurs in the high-temperature load test. However, in Sample Nos. 17 and 24 exhibiting the self heating of 20° C. or more, failures apparently occur. Therefore, deterioration in a capacitor of the present invention can be prevented even in use under a signal at a high voltage of several tens to several hundreds V.

FIG. 5 indicates that Sample Nos. 2 and 25 in the range of the present invention have low dependency on an AC voltage as compared with the capacitors of Sample Nos. 17 and 24 out of the range of the present invention. Therefore, stable capacitor characteristics without a variation in dielectric tangent tan δ can be obtained even in use under a signal at a high voltage of several hundreds V.

As described above, a dielectric ceramic composition of the present invention contains about 0.02 to 0.5% by weight of MnO, about 0.05 to 2% by weight of at least one oxide selected from the above-described group, and about 0.02 to 0.8% by weight of CuO, which are added to 100 parts by weight of the specified main component. Therefore, the dielectric tangent in the high frequency region up to 1 MHZ can be decreased, and heating with a non-sinusoidal wave containing a high harmonic wave added can thus be decreased.

In the present invention, 100% by weight of the specified main component contains about 12% by weight or less of $CaTiO_3$, and thus the self heating of a capacitor is 20° C. or less even in use under a signal at a high voltage of several tens to several hundreds V, thereby causing no deterioration in the capacitor. Furthermore, the dependency on an AC voltage is low, and thus stable capacitor characteristics without a variation in dielectric tangent tan δ can be obtained even in use under a signal at a high voltage of several hundreds V. Since the dielectric constant at 1 kHz is 1500 or more, a capacitor can be miniaturized, thereby providing a small capacitor suitable for high-frequency applications.

A capacitor of the present invention comprises thin film electrodes mainly composed of copper and formed on the outer surface of a ceramic sintered body composed of the dielectric ceramic composition of the present invention. Therefore, the external electrodes can be formed by the thin film electrodes using inexpensive copper, thereby permitting the use in the high frequency region and miniaturization, and providing an inexpensive capacitor with leads.

What is claimed is:

1. A dielectric ceramic composition comprising 100% by weight of main component comprising:
   about 35 to 55% by weight of $SrTiO_3$,
   about 10 to 35% by weight of $PbTiO_3$,
   about 5 to 12% by weight of $CaTiO_3$,
   about 8 to 25% by weight of $Bi_2O_3$, and
   about 5 to 13% by weight of $TiO_2$;
   about 0.02 to 0.5% by weight of MnO,
   about 0.05 to 2% by weight of an oxide of at least one element selected from the group consisting of La, Ce, Nd, Pr, Sm, Dy, Er and Y, and
   about 0.02 to 0.8% by weight of CuO.

2. The dielectric ceramic composition of claim 1, wherein the main component comprises:
   about 40 to 50% by weight of $SrTiO_3$,
   about 15 to 25% by weight of $PbTiO_3$,
   about 5 to 12% by weight of $CaTiO_3$,
   about 13 to 19% by weight of $Bi_2O_3$, and
   about 6 to 10% by weight of $TiO_2$.

3. The dielectric ceramic composition of claim 1, wherein the composition comprises about 0.1 to 0.5% by weight of MnO, about 0.1 to 1.2% by weight of an oxide of at least one element selected from the group consisting of La, Ce, Nd, Pr, Sm, Dy, Er and Y, and about 0.1 to 0.5% by weight of CuO.

4. The dielectric ceramic composition of claim 3, wherein said element is Ce.

5. A capacitor comprising:
   a ceramic sintered body comprising a dielectric ceramic composition according to claim 4 and having an outer surface; and
   a plurality of thin film electrodes comprising copper on the outer surface of the ceramic sintered body.

6. A capacitor according to claim 5, further comprising a lead terminal connected to each of the plurality of the thin film electrodes.

7. A capacitor comprising:
   a ceramic sintered body comprising a dielectric ceramic composition according to claim 3 and having an outer surface; and
   a plurality of thin film electrodes comprising copper on the outer surface of the ceramic sintered body.

8. A capacitor according to claim 7, further comprising a lead terminal connected to each of the plurality of the thin film electrodes.

9. A capacitor comprising:
   a ceramic sintered body comprising a dielectric ceramic composition according to claim 2 and having an outer surface; and
   a plurality of thin film electrodes comprising copper on the outer surface of the ceramic sintered body.

10. A capacitor according to claim 9, further comprising a lead terminal connected to each of the plurality of the thin film electrodes.

11. A capacitor comprising:
    a ceramic sintered body comprising a dielectric ceramic composition according to claim 1 and having an outer surface; and
    a plurality of thin film electrodes comprising copper on the outer surface of the ceramic sintered body.

12. A capacitor according to claim 11, further comprising a lead terminal connected to each of the plurality of the thin film electrodes.

* * * * *